United States Patent
Matsumoto (10) Patent No.: US 10,075,609 B2
(45) Date of Patent: Sep. 11, 2018

(54) INFORMATION PROCESSING APPARATUS AND CONTROL METHOD THEREOF FOR REDUCING TRANSITION TIME FROM A POWER-SAVE MODE

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/820,054

(22) Filed: Aug. 6, 2015

(65) Prior Publication Data

US 2016/0050335 A1    Feb. 18, 2016

(30) Foreign Application Priority Data

Aug. 14, 2014 (JP) .................. 2014-165084

(51) Int. Cl.
*G06F 13/28* (2006.01)
*G06F 12/02* (2006.01)
(Continued)

(52) U.S. Cl.
CPC ......... *H04N 1/2166* (2013.01); *G06K 15/406* (2013.01); *H04N 1/00891* (2013.01); *H04N 1/00896* (2013.01); *H04N 2201/0094* (2013.01)

(58) Field of Classification Search
CPC ............. H04N 1/2166; H04N 1/00891; H04N 1/00896; H04N 2201/0094; H04N 1/21; G06K 15/406; G06F 2213/0032; G06F 11/1417; G06F 2211/1097; G06F 1/3234; G06F 17/30147; G06F 12/0246; G06F 12/0613; G06F 12/0656; G06B 2219/24198; G04G 19/12; G11B 19/2072
(Continued)

(56) References Cited

U.S. PATENT DOCUMENTS 7,346,721 B2    3/2008 Ikeda ......................... 710/302
8,127,059 B1 *  2/2012 Carr ..................... G06F 13/387
                                                    710/74

(Continued)

FOREIGN PATENT DOCUMENTS

JP    2004-157961    6/2004
JP    2007-004666    1/2007
(Continued)

*Primary Examiner* — Benny Q Tieu
*Assistant Examiner* — Juan M Guillermety
(74) *Attorney, Agent, or Firm* — Fitzpatrick, Cella, Harper & Scinto (57) ABSTRACT

A stress of a user caused by a waiting time at the time of activation of a printing apparatus or at the time of return from a power save mode to a normal mode is reduced. An information processing apparatus having a storage device includes a control unit configured to control the information processing apparatus and a storage control unit configured to control the storage device in accordance with instructions transmitted from the control unit, and the storage control unit transmits information indicating that communication with the storage device has been established to the control unit in response to a communication establishment request from the control unit before the communication with the storage device is established.

19 Claims, 9 Drawing Sheets

(51) Int. Cl.
*H04N 1/21* (2006.01)
*H04N 1/00* (2006.01)
*G06K 15/00* (2006.01)

(58) Field of Classification Search
USPC ........ 358/1.14, 1.16; 710/5, 14–17; 711/103
See application file for complete search history.

(56) References Cited

U.S. PATENT DOCUMENTS

| | | | |
|---|---|---|---|
| 8,612,644 B2 | 12/2013 | Kumasawa et al. | 710/36 |
| 8,943,234 B1 * | 1/2015 | Voorhees | G06F 13/385 |
| | | | 710/17 |
| 9,288,355 B2 * | 3/2016 | Naka | H04N 1/00891 |
| 2002/0073275 A1 * | 6/2002 | Tsurumaki | G06F 3/0607 |
| | | | 711/112 |
| 2006/0095625 A1 * | 5/2006 | Wootten | G06F 13/385 |
| | | | 710/300 |
| 2007/0223517 A1 * | 9/2007 | Warren | G06F 3/0607 |
| | | | 370/463 |
| 2008/0056424 A1 * | 3/2008 | Chang | G06F 13/4295 |
| | | | 375/371 |
| 2008/0086576 A1 * | 4/2008 | Schauer | G06F 13/387 |
| | | | 710/5 |
| 2009/0275291 A1 * | 11/2009 | Myouga | G06F 11/2221 |
| | | | 455/67.14 |
| 2010/0274986 A1 * | 10/2010 | Matsumoto | G06F 12/02 |
| | | | 711/154 |
| 2011/0222181 A1 * | 9/2011 | Ishii | G06F 11/221 |
| | | | 360/31 |
| 2012/0084492 A1 * | 4/2012 | Stenfort | G06F 12/0246 |
| | | | 711/103 |
| 2013/0198357 A1 * | 8/2013 | Wang | H04L 41/00 |
| | | | 709/223 |
| 2013/0238837 A1 * | 9/2013 | Sawaoka | G06F 12/0246 |
| | | | 711/103 |
| 2013/0262750 A1 * | 10/2013 | Yamasaki | G06F 3/0611 |
| | | | 711/103 |
| 2014/0029040 A1 * | 1/2014 | Tsuji | H04N 1/00912 |
| | | | 358/1.16 |
| 2014/0055800 A1 * | 2/2014 | Matsumoto | H04N 1/00896 |
| | | | 358/1.15 |
| 2014/0059277 A1 * | 2/2014 | Chung | G06F 12/0246 |
| | | | 711/103 |
| 2014/0143572 A1 * | 5/2014 | Horiuchi | G06F 1/3203 |
| | | | 713/323 |
| 2014/0176976 A1 * | 6/2014 | Tsukahara | G06K 15/406 |
| | | | 358/1.13 |
| 2015/0039787 A1 * | 2/2015 | Voorhees | G06F 13/385 |
| | | | 710/17 |
| 2015/0086014 A1 * | 3/2015 | Adkins | H04N 1/4486 |
| | | | 380/243 |
| 2016/0011792 A1 * | 1/2016 | Hirashima | G06F 3/0611 |
| | | | 711/111 |
| 2016/0011938 A1 * | 1/2016 | Koseki | G06F 3/0619 |
| | | | 714/766 |

FOREIGN PATENT DOCUMENTS

| | | |
|---|---|---|
| JP | 2008-041050 | 2/2008 |
| JP | 2008-181358 | 8/2008 |
| JP | 2010-124076 A | 6/2010 |
| JP | 2013-125451 | 6/2013 |

* cited by examiner

INFORMATION PROCESSING APPARATUS AND CONTROL METHOD THEREOF FOR REDUCING TRANSITION TIME FROM A POWER-SAVE MODE

BACKGROUND OF THE INVENTION

Field of the Invention

The present invention relates to a control technique of a printing apparatus.

Description of the Related Art

It is common for a recent printing apparatus to include a power save mode function to reduce power during standby. In the case where the printing apparatus is in the activated state and is not used for a fixed period of time, the mode automatically changes from the normal mode into the power save mode, and thereby, power during standby is reduced. In the power save mode, power during standby can be reduced, but it is not possible to immediately start printing processing, and therefore, the power save mode and user's convenience are in the relationship of trade-off. In other words, in the power save mode, it is necessary to return from the power save mode to the normal mode the next time a user uses the printing apparatus, and therefore, there is a demerit in that a user needs to wait for the time needed for the return. In particular, in the case where activation of a hard disk device is necessary for the return from the power save mode, time is taken by a storage unit (disc) having a physical structure to reach a stable predetermined rotation speed and time is taken by self-diagnostic processing, such as a write and read processing check. Because of this, the activation time of the hard disk device alone takes several seconds to a ten and some seconds.

As to this point, a proposal has been presented that a wasteful access time until the hard disk device can be accessed is excluded at the time of return from the power save mode (e.g., Japanese Patent Laid-Open No. 2010-124076). The method of Japanese Patent Laid-Open No. 2010-124076 is as follows.

At the time of change into the power save mode, information (state information) necessary to return to the same state as the previous state at the time of return the next time is divided into two pieces of information and those two pieces of information are stored in two kinds of nonvolatile storage devices, respectively, which take different times to reach the state where the storage device can be read.

At the time of return from the power save mode, the divided state information that is saved is acquired in order from the storage device that reaches the state where the storage device can be read earlier and the information is set again to various resources, and thereby, the state before the power save mode is entered is returned.

With this method, by using a hard disk device as one of the two kinds of nonvolatile storage devices and a Flash memory that can activate quickly as the other, it is made possible to start the activation processing from the Flash memory without the need to wait until the hard disk device activates, which takes time for activation.

However, with the method of Japanese Patent Laid-Open No. 2010-124076 described above, the state information necessary for return is divided into two pieces and one of them is saved in the hard disk device that slowly activates, and therefore, there is a possibility that the time taken for return will be affected eventually by the activation time of the hard disk device.

Further features of the present invention will become apparent from the following description of exemplary embodiments (with reference to the attached drawings).

SUMMARY OF THE INVENTION

The printing apparatus according to the present invention is an information processing apparatus having a storage device, the information processing apparatus comprising, a control unit configured to control the information processing apparatus, and a storage control unit configured to control the storage device in accordance with instructions transmitted from the control unit, wherein the storage control unit transmits information indicating that communication with the storage device has been established to the control unit in response to a communication establishment request from the control unit before the communication with the storage device is established.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
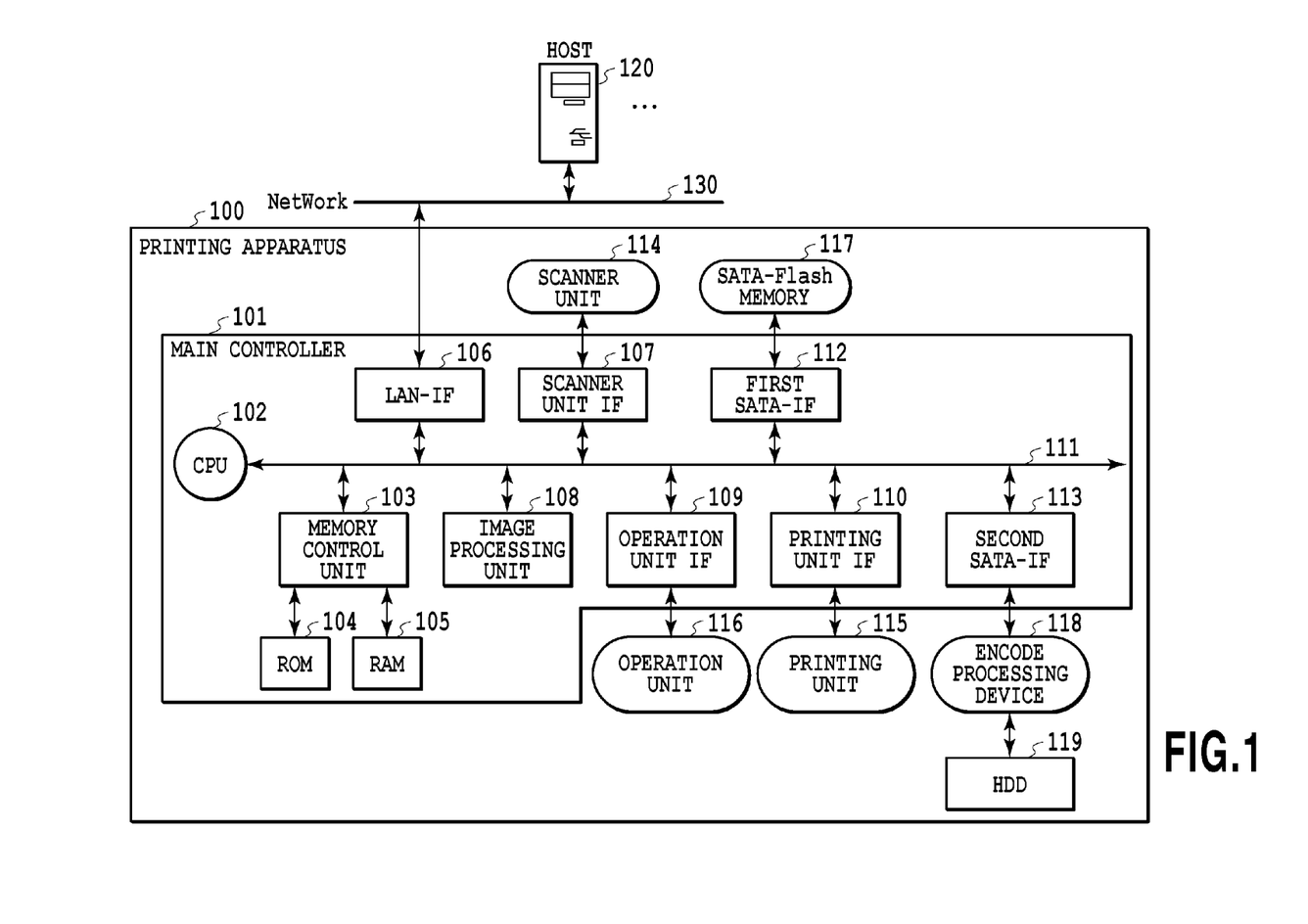
FIG. 1 is a diagram showing a configuration example of a printing system.

FIG. 1 is a diagram showing a configuration example of a printing system according to the present embodiment. The printing system includes a printing apparatus 100 and a host computer 120 and both are connected to each other via a network 130, such as a LAN.

The printing apparatus 100 includes a main controller 101, a scanner unit 114, a printing unit 115, an operation unit 116, a SATA-Flash memory 117, an encode processing device 118, and an HDD 119. Hereinafter, detailed explanation is given.

The main controller 101 is a control unit configured to control the whole of the printing apparatus. A CPU 102 within the main controller reads programs stored in a ROM 104 and controls each unit and performs various kinds of calculation processing. A memory control unit 103 performs input/output control to and from various memory devices and DMA (Direct Memory Access) control. The ROM 104 is a read-only memory represented by the Flash memory and stores BIOS (Basic Input/Output System) programs, control parameters, etc. In the case where the Flash memory is connected, on-board rewriting is possible. A RAM 105 is a rewrite-only memory represented by a DDR memory and used as a work area of a program, a storage area of print data, etc. A LAN-IF 106 is an interface with the LAN 130 connected to the printing apparatus 100 and is generally compatible with the TCP/IP protocol. The LAN-IF 106 is connected to a network compatible device, such as the external host computer 120, via a network cable, and therefore, it is possible to perform printing processing via the network. Further, it is also possible to connect to the Internet via a router. A scanner unit IF 107 is an interface that performs communication control with the scanner unit 114 and implements a copy function by printing image data acquired by a scan in the scanner unit 114. An image processing unit 108 performs various kinds of image processing on image data taken in via the LAN-IF 106 and the scanner unit IF 107. An operation unit IF 109 is an interface that performs communication control with the operation unit 116 and it is possible to check the various settings and states of the printing apparatus 100 by producing a display on a liquid crystal screen and operating buttons or the like on an operation panel, not shown. An printing unit IF 110 is an interface that performs communication control of commands and statuses with the printing unit 115 and transfers print data. The printing unit 115 includes a print engine, a paper feed system, and a paper discharge system, not shown, and prints print data on paper or the like in accordance with command information mainly from the printing unit IF 110. A system bus 111 represents all control buses, data buses, and local buses between arbitrary blocks together for convenience and as a representative, there is PCIe (PCI Express) or the like.

A first SATA-IF 112 and a second SATA-IF 113 are interfaces based on the SATA (Serial Advanced Technology Attachment) standard, which perform data input/output control with a nonvolatile storage device. To the first SATA-IF 112, the SATA-Flash memory 117 is connected. The SATA-Flash memory 117 is a primary storage device and in which activation programs, various application programs, various parameters, etc., are stored. The boot processing of the CPU 102 is performed by the activation program stored in the SATA-Flash memory 117, which is a primary storage device. To the second SATA-IF 113, the encode processing device 118 and the HDD (Hard Disk Device) 119 are connected. The HDD 119 is a secondary storage device and is used as a temporary work area for application program setting parameters and at the time of printing processing, and as a storage area of user data. The encode processing device 118 is one kind of SATA-SATA bridge devices located in the middle between the second SATA-IF 113 and the HDD 119, and also has a data encode processing function, in addition to a function as a storage control unit configured to control the storage device. In other words, the encode processing device 118 performs encoding/decoding processing on the input/output data from the second SATA-IF 113, which is the SATA-Host, and performs write and read processing to and from the HDD 119.

Here, the encode processing device 118 is configured as an external device that is connected to the main controller 101, but as a matter of course, a configuration in which the function of the encode processing device 118 is incorporated inside the main controller 101 may be accepted.

Further, it may also be possible to configure the HDD 119 as an external device of the main body of the printing apparatus 100.

Figure 2:
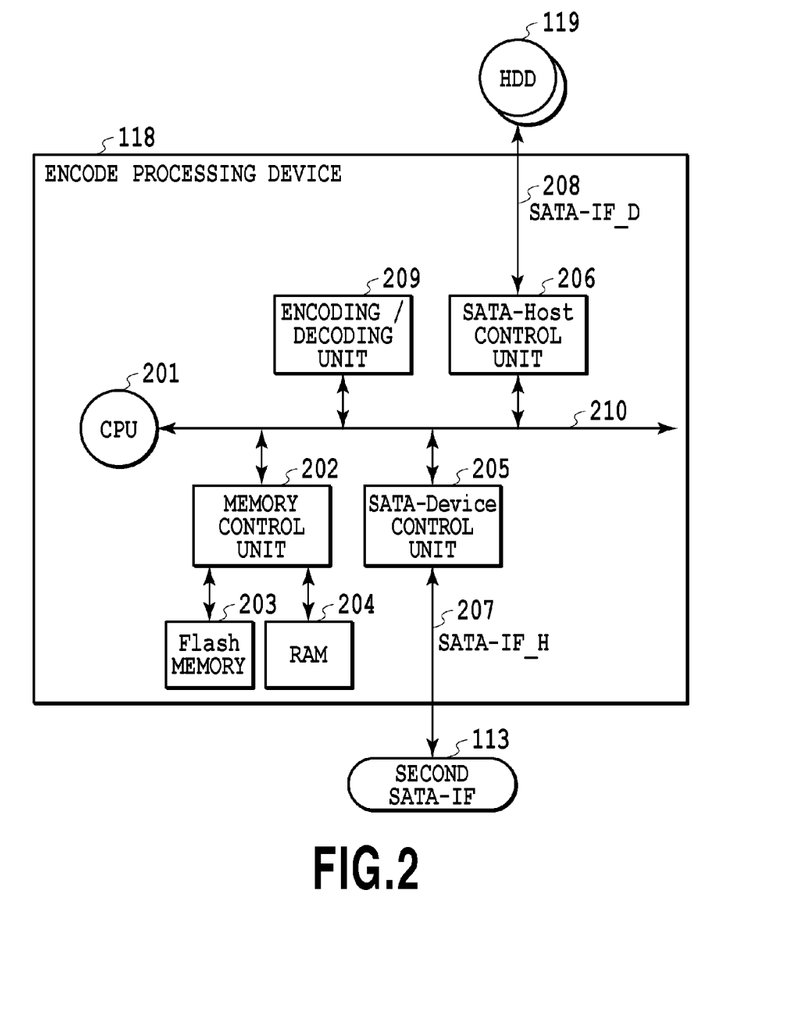
FIG. 2 is a diagram showing an internal configuration example of an encode processing device.

FIG. 2 is a diagram showing an internal configuration example of the encode processing device 118. The encode processing device 118 includes a CPU 201, a memory control unit 202, a Flash memory 203, a RAM 204, a SATA-Device control unit 205, a SATA-Host control unit 206, a SATA-IF_H 207, a SATA-IF_D 208, an encoding/decoding unit 209, and a system bus 210.

The CPU 201 performs system control and various kinds of calculation processing. The memory control unit 202 performs input/output control to and from various memory devices and DAM control. The Flash memory 203 is a rewritable nonvolatile memory and in which control programs, encoding/decoding programs, control parameters, etc., are stored. The RAM 204 is a rewritable volatile memory that can be accessed quickly and used for loading part of the programs stored in the Flash memory 203, and used as a work area and a data buffer area thereof. The SATA-Device control unit 205 is connected with the second SATA-IF 113, which is the SATA-Host, (hereinafter, called the "host") via the interface SATA-IF_H 207 based on the SATA standard and performs control processing in response to a data input/output request from the host. The SATA-Host control unit 206 is connected with the HDD 119, which is the SATA-Device, via the interface SATA-IF_D 208 based on the SATA standard and performs control of data input/output with the HDD 119. In other words, the encode processing device 118 has a function as a SATA-SATA bridge device for the data input/output request from the second SATA-IF 113, which is the "host", to the HDD 119, which is the "device". The encoding/decoding unit 209 performs encoding processing in response to a data write request from the host, and performs decoding processing in response to a data read request. The system bus 210 represents all control buses, data buses, and local buses between arbitrary blocks together for convenience.

<Power Save Mode>

Next, an outline of the power save mode and processing to return from the power save mode are explained.

The power save mode is an operation mode aiming at a reduction in power during standby while a user is not using the printing apparatus and having a concept opposite to that of the normal mode, which is an operation mode in which various functions can be used immediately. As described previously, the power save mode and user's convenience are in the relationship of trade-off, and therefore, it is common to have several levels according to differences in time necessary to return to the normal mode. For example, in the power save mode at the highest level in which the effect of reducing power is great but it takes a long time to return to the normal mode, only the RAM 105 and part of the functions in relation to the control of the RAM 105 are made to operate and the supply of power to other portions is shut off. In other words, in this case, the supply of power source to the SATA-Flash memory 117, which is the primary storage device, and the HDD 119, which is the secondary storage device, is also stopped.

Figure 3:
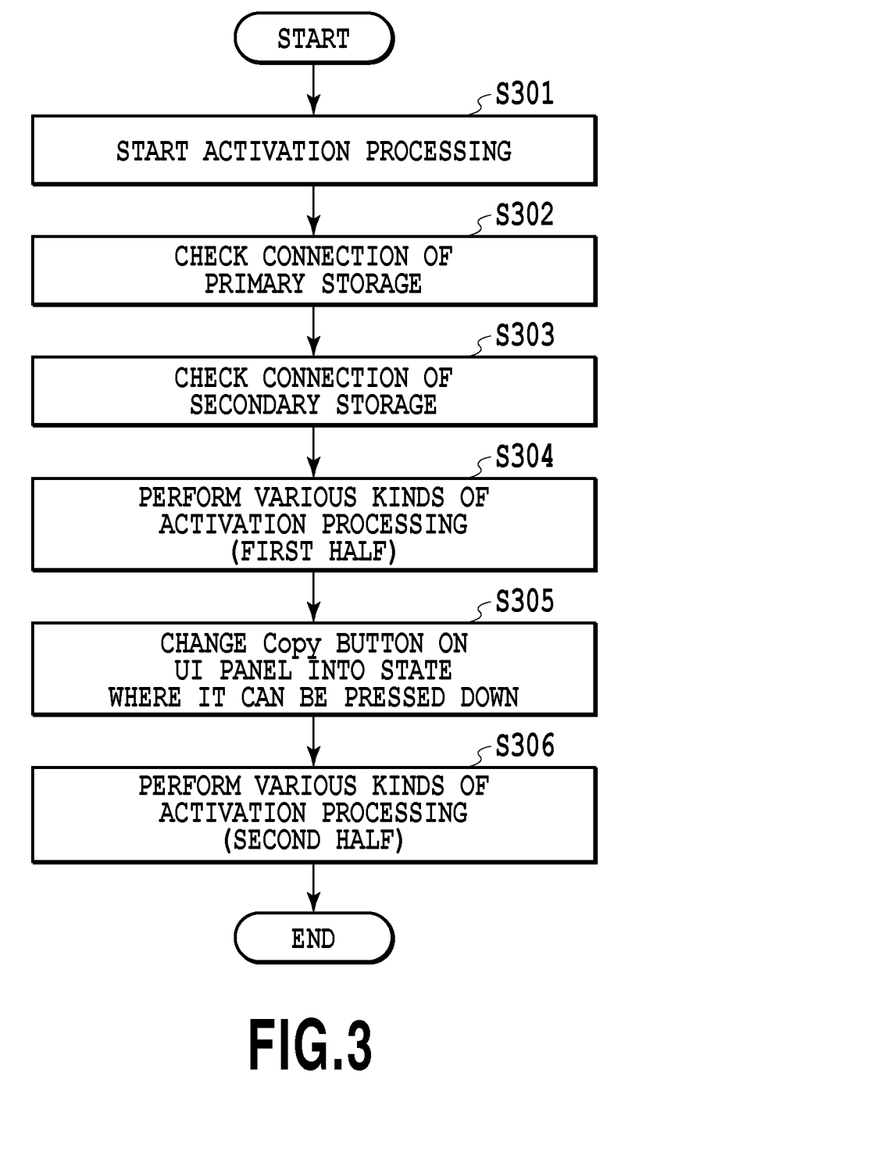
FIG. 3 is a flowchart showing a flow of processing to return from a power save mode.

FIG. 3 is a flowchart showing a flow of the processing to return from the power save mode at the highest level described above in the main controller 101. Here, an outline flow of the return processing is explained and the portions in relation to the present invention are explained separately in detail by using drawings.

At step 301, the CPU 102 to which the supply of power has been started starts activation processing by using data held in the RAM 105.

At step 302, the CPU 102 performs a connection check of the SATA-Flash memory 117, which is the primary storage. In this case, the SATA-Flash memory 117 consists of a semiconductor device, and therefore, can activate quickly. Together with the connection check, predetermined processing is performed where necessary, but the processing does not relate to the present invention, and therefore, explanation is omitted.

At step 303, the CPU 102 performs a connection check of the HDD 119. In this case, the HDD 119 takes several seconds to a ten and some seconds to activate depending on the disc size and capacity of the HDD 119. Further, together with the connection check, predetermined processing is performed where necessary. The predetermined processing here relates to a proxy response, which is an important element in the present invention. Details thereof will be described later.

At step 304, the CPU 102 performs various kinds of activation processing in relation to the first half of the return processing. The various kinds of activation processing do not relate to the present invention, and therefore, explanation is omitted.

Figure 4:
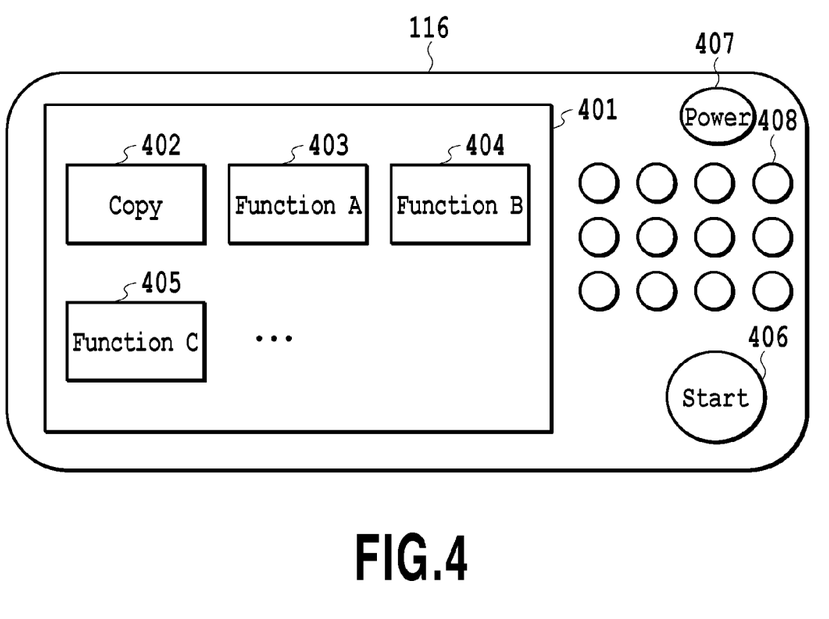
FIG. 4 is a diagram showing a configuration example of an operation unit.

At step 305, the CPU 102 displays various function buttons on the liquid crystal screen of the operation unit 116. For example, the CPU 102 changes a copy button, which is a button that implements a basic function of the printing apparatus 100, into a state where a user can press down the copy button. At this point in time, a user who uses the printing apparatus 100 is enabled to start an operation to use the copy function or the like. FIG. 4 is a diagram showing a configuration example of the operation unit 116. On a liquid crystal panel 401, icons corresponding to various functions that can be used in the printing apparatus 100 are displayed. In the example in FIG. 4, in addition to a Copy icon 402, which is an icon that implements the most basic function, icons 403 to 405 corresponding to functions A to C, respectively, are displayed. A Start button 406 is a button for a user to fix the start of processing of a selected icon after selecting one of the icons 402 to 405 described above and performing various settings. For example, copy processing is started by a user selecting the Copy icon 402 and pressing down the Start button 406 after performing necessary settings. A Power source button 407 is an LED built-in button that is controlled by firmware and is used in the case where the state of the printing apparatus 100 is changed from the power save mode into the normal mode, or in the case where it is desired to forcibly change the state into the power save mode. Normally, the state where the power save mode is available or the state where the power save mode is unavailable is reported to a user by a green or orange LED lighting up. Other buttons 408, such as a ten-key, play auxiliary roles for user's operations.

At step 306, the CPU 102 performs various kinds of activation processing in relation to the second half of the return processing. The various kinds of activation processing also do not relate to the present invention, and therefore, explanation is omitted.

The above is the outline of the processing to return from the power save mode in the main controller 101.

<Proxy Response>

Next, the above-described proxy response is explained. Here, "return from the power save mode to the normal mode" or "until the activation at the time of normal activation by power source switch on is fixed" is defined as "until the state is brought about where a user can press down the Start button 406 (see step 305) after selecting the above-described icons 402 to 405". At this time, in order to suppress the time taken for the state to change into the state defined as described above to a time as short as possible, and to prevent a user from feeling a stress both bodily and substantially, a key is to solve the problem of the activation time of the HDD 119.

Figure 5:
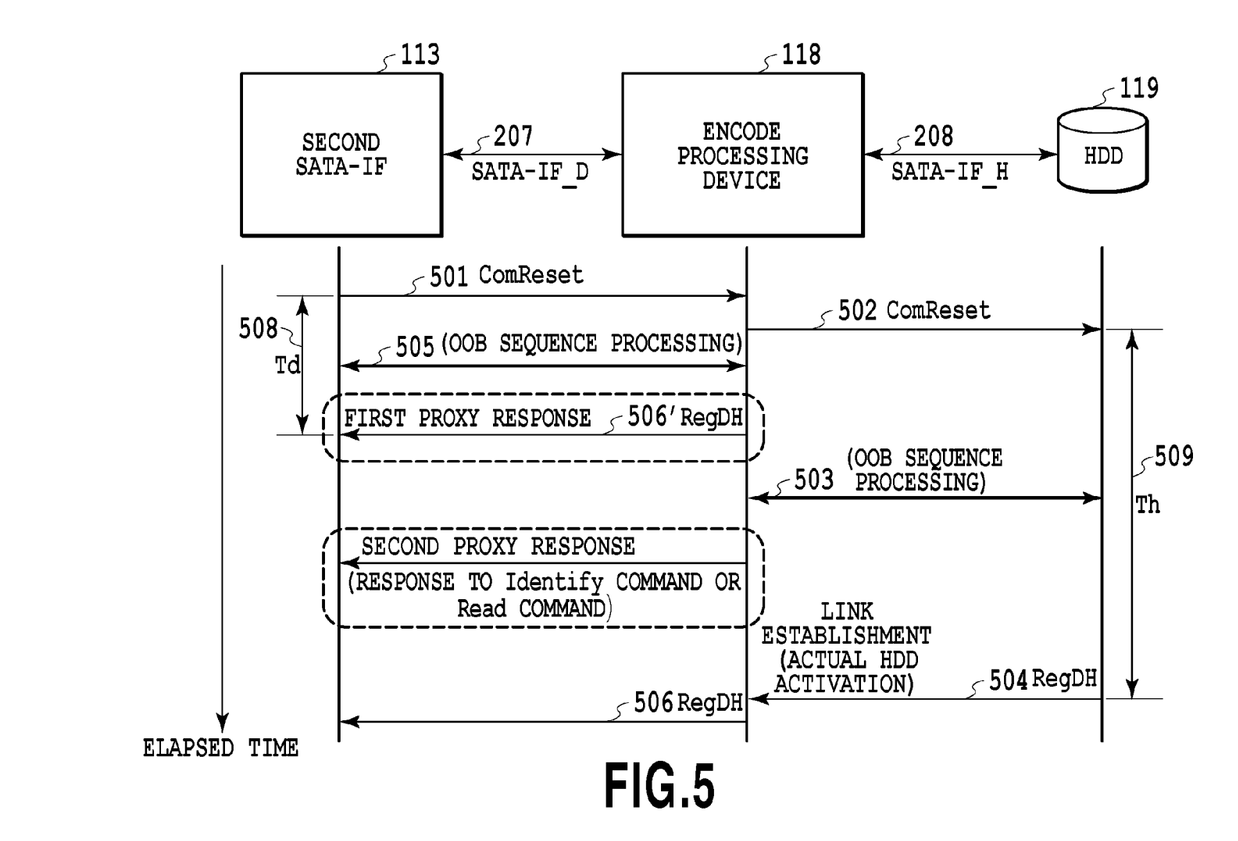
FIG. 5 is a diagram chronologically representing a return sequence of a process to return from a power save mode to a normal mode.

FIG. 5 is a diagram chronologically representing the return sequence of the process to return from the power save mode to the normal mode between the second SATA-IF 113 (the main controller 101), the encode processing device 118, and the HDD 119. According to the SATA standard, it is necessary to establish a link (communication) between each IF through predetermined sequence processing at the time of turning on the power source. In the following, the process until link establishment is explained chronologically.

First, after the power source is turned on, the second SATA-IF 113, which is the host, issues a ComReset signal (proper noun defined by the SATA standard) 501 as a communication establishment request to the encode processing device 118 in the next stage. Then, the encode processing device 118 having received the ComReset signal 501 further issues a ComReset signal 502 as a communication establishment request similarly to the HDD 119 in the next stage. According to the SATA standard, the starting point of link establishment is basically the issuance of the ComReset signal from the side of the SATA-Host interface. Then, through OOB (Out of Band) processing and speed negotiation processing sequentially, link establishment is finally completed by the reception of a RegDH (Register Device to Host) signal from the side of the SATA-Device interface. It is assumed that the series of flows is called OOB sequence processing. According to the SATA standard, it is also possible to establish a link by taking a ComInit signal issued from the side of the SATA-Device interface as the starting point. Subsequently, by the ComReset signal 502 from the encode processing device 118, OBB sequent processing 503 with the HDD 119 is started. After this, after an elapsed time Th 509, link establishment (state where the activation of the HDD 119 is completed and the HDD 119 can be accessed from the high-order host) is completed by the encode processing device 118 receiving a RegDH signal 504 from the HDD 19. Then, as the above-described elapsed time Th 509, several seconds to a ten and some seconds are necessary.

On the other hand, also between the second SATA-IF 113 and the encode processing device 118, OOB sequence processing 505 is started with the ComReset signal 501 as the starting point and link establishment is completed by the issuance of a RegDH signal 506 from the encode processing device 118.

Here, the timing at which the encode processing device 118 issues the RegDH signal 506 indicating link establishment is generally after the RegDH signal 504 from the HDD 119 is received as shown in FIG. 5. The reason is that it is not possible to access the HDD 119 (still in the state where access is not available) until the RegDH signal 504 is received.

In the present invention, the encode processing device 118 immediately issues a RegDH signal 506' to the second SATA-IF 113 without waiting for the RegDH signal 504 from the HDD 119. In other words, the encode processing device 118 issues the RegDH signal 506' for the ComReset signal 501, which is a communication establishment request from the main controller 101, regardless of the activation state of the HDD 119 (regardless of whether the HDD 119 is normal or abnormal as a result). Because of this, an elapsed time Td 508 in the meantime may be a very short time, and link establishment is completed. Specifically, while the elapsed time Th 509 is several seconds to a ten and some seconds, the elapsed time Td 508 is about 1 to 2 ms. Here, the issuance (transmission) of the RegDH signal 506', which can be said as a dummy response because the response is not made in response to actual activation of the HDD 119, is called a "first proxy response". Then, after the first proxy response is made, the link establishment is completed in a pseudo manner, and therefore, the issuance of various commands from the second SATA-IF 113, which is the host, is permitted. Then, in the process of the return from the power save mode or the activation processing, after the above-described first proxy response is made, for example, specific commands as below for acquiring information about the HDD 119 are issued as a sine qua non of the system.

An Identify command for acquiring information, such as the serial number, performance, and setting values, in order to investigate the connection state or to check that the connected HDD 119 is an expected device A Read command for reading an MBR (Master Boot Record) from the HDD 119, which is the secondary storage, in order to create a partition table In the present specification, the responses of the encode processing device 118 for the specific commands issued from second SATA-IF 113, which are necessary at the time of return or activation and which are made after the first proxy response, are called a "second proxy response" as a generic name.

Next, the above-described return sequence and the control flow inside the second SATA-IF 113 and the encode processing device 118 are explained, respectively, in detail.

First, the control flow inside the encode processing device 118 is explained.

Figure 6:
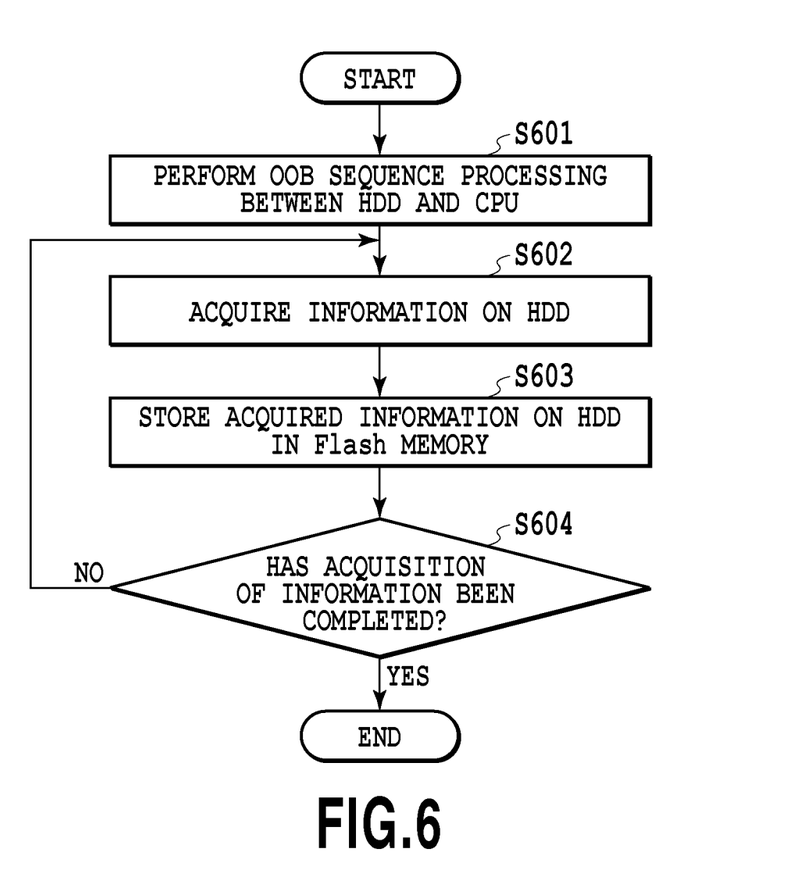
FIG. 6 is a flowchart showing a flow of processing to store information on an HDD in an internal storage unit.

FIG. 6 is a flowchart showing a flow of processing to store information on the HDD 119 in the Flash memory 203 as an internal storage unit, which is performed in the encode processing device 118 as a storage control unit at the time of the first activation of the printing apparatus 100.

At step 601, the CPU 201 establishes a link by performing the OOB sequence processing 503 with the HDD 119.

At step 602, the CPU 201 acquires information on the HDD 119 by issuing a specific command necessary for the second proxy response.

At step 603, the CPU 201 stores the information on the HDD 119 acquired at step 602 in the Flash memory 203 within the encode processing device 118.

At step 604, the CPU 201 determines whether the acquisition of the information necessary for the second proxy response has been completed. In the case where there is still necessary information that has not been acquired yet, the processing returns to step 602 and the processing to acquire information on the HDD 119 is repeated. On the other hand, in the case where all the necessary information has been acquired, the present processing is terminated.

The above is the contents of the processing to store the information on the HDD 119 in the internal storage unit in the encode processing device 118. This processing is performed only once without exception at the time of the first activation in the case where the information necessary for the second proxy response is updated (e.g., in the case where a new hard disk device is attached).

Figure 7:
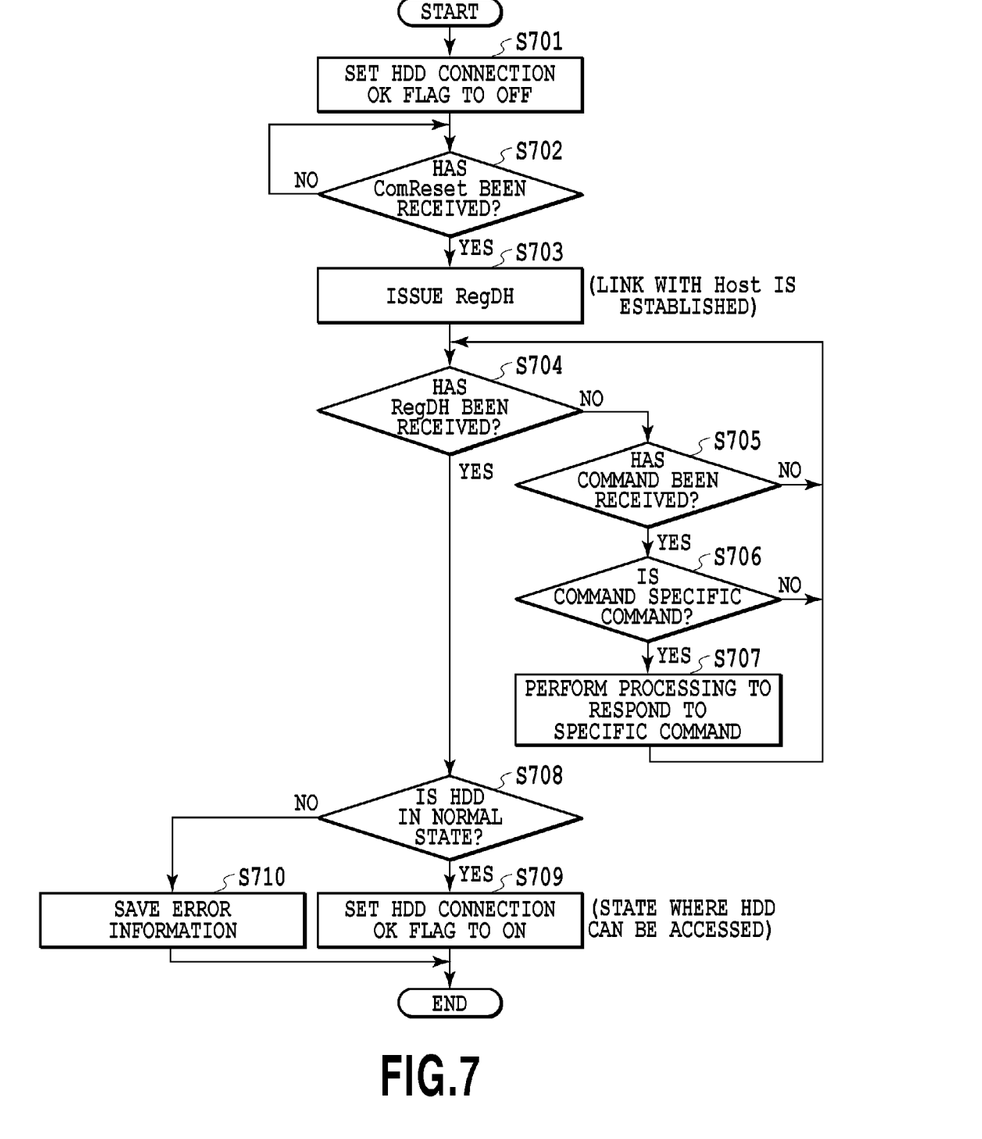
FIG. 7 is a flowchart showing a flow of link establishment processing in the encode processing device.

FIG. 7 is a flowchart showing a flow of link establishment processing in the encode processing device 118 according to the present embodiment.

At step 701, the CPU 201 sets an HDD connection OK flag indicating the connection state of the HDD 119 to "OFF" in the initial state immediately after the power source of the printing apparatus 100 is turned on. At this time, a setting value (e.g., "0") indicating OFF, which means the unconnected state where communication with the HDD 119 is not established, is saved in the Flash memory 203.

At step 702, the CPU 201 determines whether the ComReset signal 501 has been received from the second SATA-IF 113, which is the host. In the case where the ComReset signal 501 has been received from the second SATA-IF 113, the processing proceeds to step 703. On the other hand, in the case where the ComReset signal 501 has not been received from the second SATA-IF 113, the CPU 201 continues the state of waiting for reception of the ComReset signal 501.

At step 703, the CPU 201 performs the OBB sequence processing 505 between the second SATA-IF 113 and the CPU 201. Then, at the end of the OOB sequence processing 505, the CPU 201 immediately issues the RegDH signal 506' as the first proxy response described previously. Due to this, a link is established in a pseudo manner between the second SATA-IF 113 and the encode processing device 118.

At step 704, the CPU 201 determines whether the RegDH signal 504 has been received from the HDD 119. In the case where the RegDH signal 504 has not been received from the HDD 119, the processing proceeds to step 705. On the other hand, in the case where the RegDH signal 504 has been received from the HDD 119, the processing proceeds to step 708.

At step 705, the CPU 201 determines whether a command has been received from the second SATA-IF 113. In the case where a command has been received from the second SATA-IF 113, the processing proceeds to step 706. On the other hand, in the case where a command has not been received from the second SATA-IF 113, the CPU 201 continues the state of waiting for reception of the RegDH signal 504 (the processing returns to step 704).

At step 706, the CPU 201 determines whether the command received from the second SATA-IF 113 is the specific command (Identify command, Read command, etc.) described previously. In the case where the received command is the specific command, the processing proceeds to step 707. On the other hand, in the case where the received command is a command other than the specific command, the CPU 201 continues the state of waiting for reception of the RegDH signal 504 (the processing returns to step 704).

At step 707, the CPU 201 performs response processing corresponding to the specific command received from the second SATA-IF 113. After the response processing corresponding to the specific command is completed, the processing returns to step 704 and the CPU 201 continues the state of waiting for reception of the RegDH signal 504. In this manner, until the processing for all the specific commands is completed, the processing at step 704 to step 707 is repeated.

At step 708, the CPU 201 determines whether the state of the HDD 119 is normal. Specifically, the CPU 201 checks whether there is an error in the register value attached to the RegDH signal 504 received at step 704 and determines whether the HDD 119 is in a Ready state where the HDD 119 can be accessed at any time as a hard disk device or in a Busy state where the HDD 119 cannot be accessed for some reason. In the case where the state of the HDD 119 is normal, the processing proceeds to step 709. On the other hand, in the case where the state of the HDD 119 is not normal, the processing proceeds to step 710.

At step 709, the CPU 201 sets the above-described HDD connection OK flag to "ON". At this time, a setting value (e.g., "1") indicating ON is saved in the Flash memory 203. At this point in time, the real link establishment between the encode processing device 118 and the HDD 119 is completed and it is also checked that the state of the HDD 119 is normal. Then, the CPU 201 performs processing to advance the state by, for example, one stage or the like where necessary, and thus enables the start of the normal processing to access the HDD 119, and then, the present processing is terminated.

At step 710, the CPU 201 saves information (error information) indicating that the HDD 119 is not normal in the Flash memory 203. In this case, the error information that is saved in the Flash memory 203 is acquired by the CPU 102 of the printing apparatus 100 via the second SATA-IF 113 and appropriate error processing is performed. In the meantime, the encode processing device 118 stops the processing to access the HDD 119 and enters the standby state.

The above is the contents of the link establishment processing in the encode processing device 118.

Next, the control flow of link establishment on the side of the main controller 101 (the second SATA-IF 113) is explained.

Figure 8:
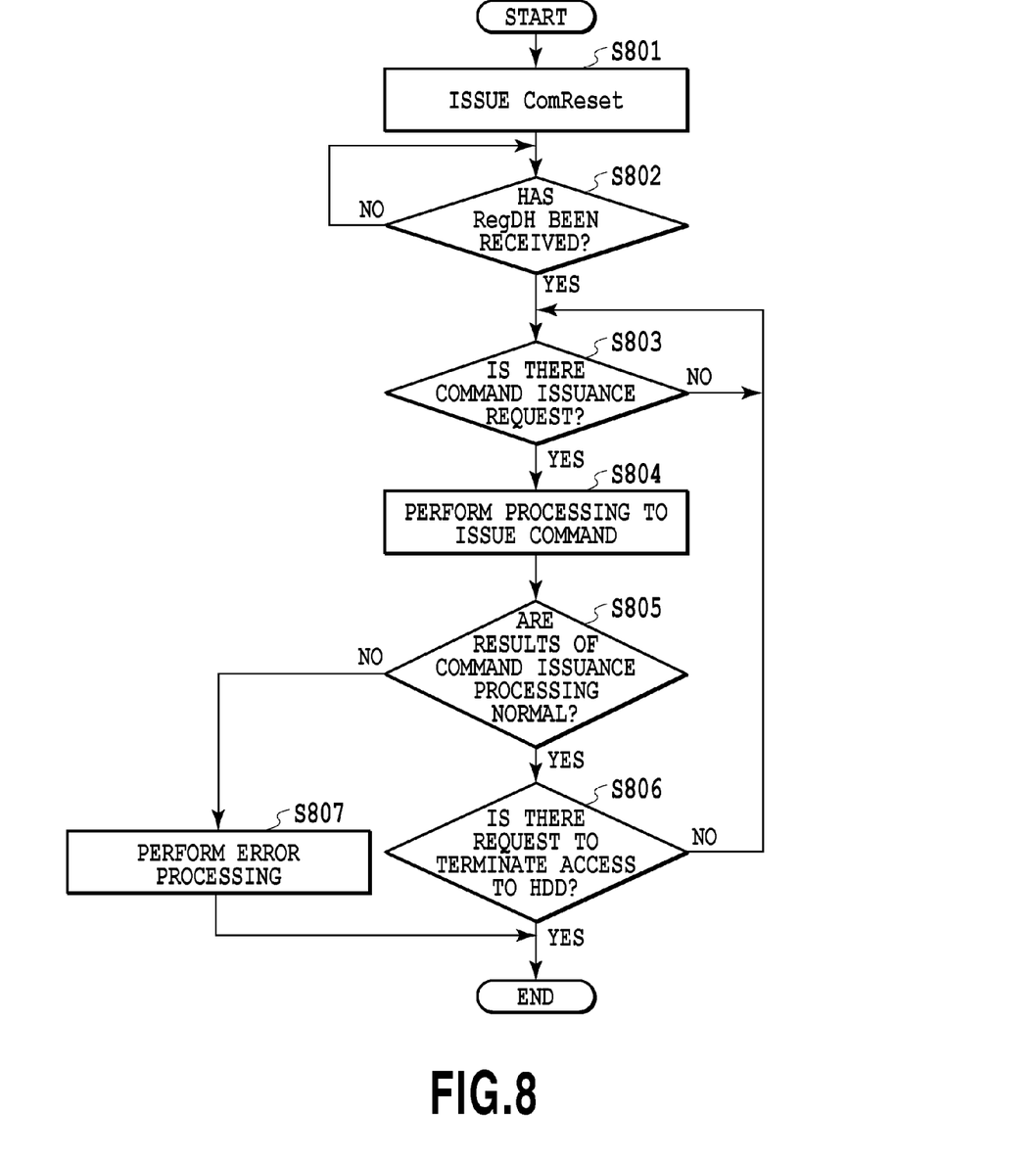
FIG. 8 is a flowchart showing a flow of processing from activation until command issuance on the side of a main controller.

FIG. 8 is a flowchart showing a flow of the processing from activation until command issuance.

At step 801, the second SATA-IF 113 issues the ComReset signal 501 and starts the OOB sequence processing 505 between the encode processing device 118 and the second SATA-IF 113.

At step 802, the CPU 102 determines whether the RegDH signal 506' (i.e., the first proxy response) has been received from the encode processing device 118. In the case where the RegDH signal 506' has not been received from the encode processing device 118, the CPU 102 continues the reception waiting state. In the case where the RegDH signal 506' has been received from the encode processing device 118, the processing proceeds to step 803.

At step 803, the CPU 102 determines whether there is a command issuance request. In the case where there is no command issuance request, the CPU 102 continues the state of waiting for a command issuance request. In the case where there is a command issuance request, the processing proceeds to step 804.

At step 804, the CPU 102 performs processing to issue the requested command (including the specific command) to the encode processing device 118.

At step 805, the CPU 102 determines whether the results of the command issuance processing performed at step 804 are normal (e.g., whether the second proxy response is made correctly from the encode processing device 118 for the issued specific command). In the case where the results of the command issuance processing are normal, the processing proceeds to step 806. On the other hand, in the case where the results of the command issuance processing are not normal, the processing proceeds to step 807.

At step 806, the CPU 102 determines whether there is a request to terminate the access to the HDD 119. In the case where there is a request to terminate the access to the HDD 119, the present processing is terminated. Specifically, the CPU 102 terminates the access to the HDD 119 by performing shut-down processing to turn off the power source of the encode processing device 118 and the HDD 119 as, for example, a preparation to change from the normal mode into the power save mode. On the other hand, in the case where there is no request to terminate the access to the HDD 119, the processing returns to step 803 and the CPU 102 enters the standby state for a command issuance request.

At step 807, the CPU 102 performs appropriate error processing. The contents of the error processing do not relate to the present invention, and therefore, explanation is omitted.

The above is the contents of the processing from activation until command issuance on the side of the main controller 101. As described above, the reception of the RegDH signal 506' at step 802 corresponds to the above-described first proxy response and the portion in relation to the specific command among the command issuance processing at step 803 and step 804 corresponds to the above-described second proxy response.

Figure 9:
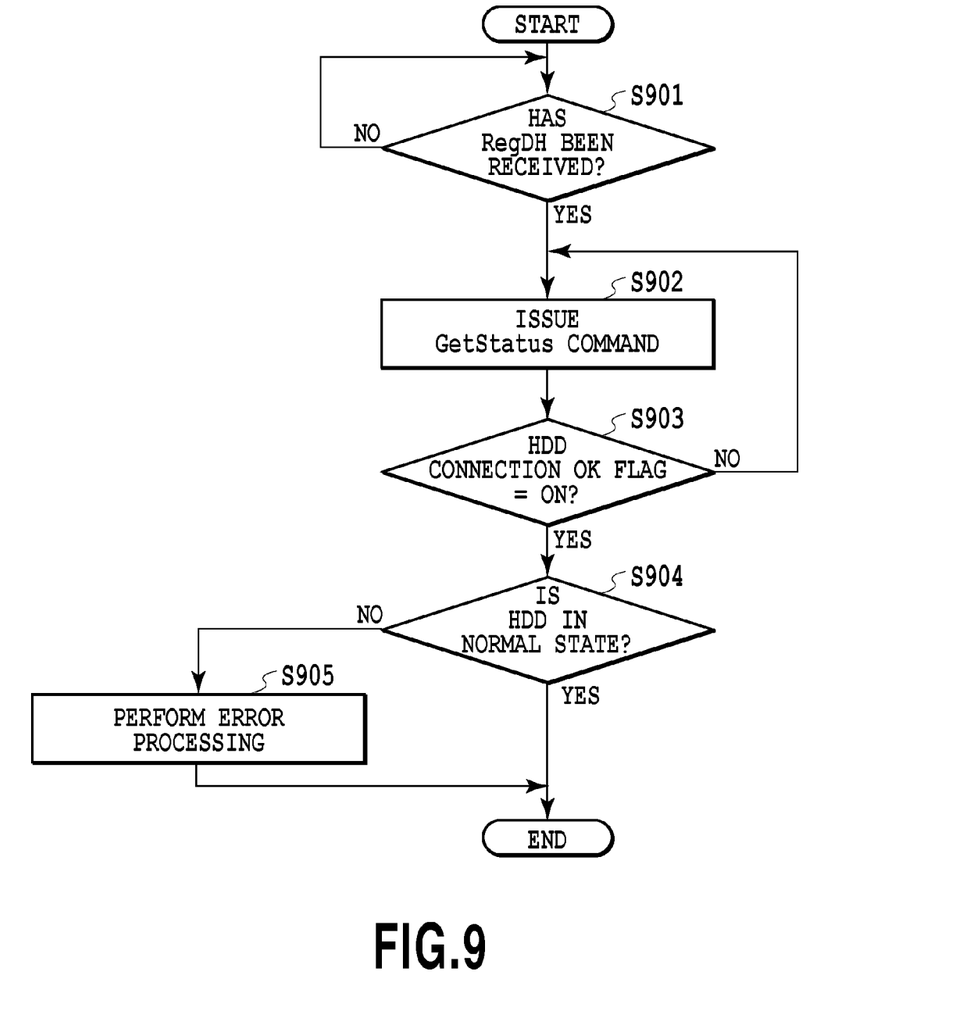
FIG. 9 is a flowchart showing a flow of processing to acquire states of the encode processing device and the HDD on the side of the main controller.

FIG. 9 is a flowchart showing a flow of processing to acquire the state of the encode processing device 118 and the HDD 119 on the side of the main controller 101. This processing is performed in parallel with the "processing from activation until command issuance" shown in FIG. 8 described above.

At step 901, the CPU 102 determines whether the RegDH signal 506' (i.e., the first proxy response) has been received from the encode processing device 118. In the case where the RegDH signal 506' has not been received from the encode processing device 118, the CPU 102 continues the reception waiting state. In the case where the RegDH signal 506' has been received from the encode processing device 118, the processing proceeds to step 902. The processing at this step is the same as the processing at step 802 in the flowchart in FIG. 8 described previously.

At step 902, the CPU 102 issues a GetStatus command to the encode processing device 118 via the second SATA-IF 113, which is the host. Here, the GetStatus command is a command for acquiring various kinds of status information on the encode processing device 118 and the HDD 119. The GetStatus command is one of extended commands obtained by causing a vendor unique command (null command) defined in the SATA standard to have the meaning (contents) unique to the system. By issuing the GetStatus command, it is possible for the CPU 102 to acquire information about the current state and situation of the encode processing device 118 and the HDD 119. Then, the various kinds of status information include information indicating whether or not the state of the HDD 119 is normal, in addition to the information on the HDD connection OK flag (setting contents).

As step 903, the CPU 102 determines the connection state of the HDD 119 from the information on the HDD connection OK flag included in the various kinds of status information acquired at step 902. In other words, the CPU 102 determines whether the HDD 119 is in the state where a link with the encode processing device 118 is established. In the case where the HDD 119 is not in the state where a link with the encode processing device 118 is established (in the case where the HDD connection OK flag=OFF), the processing returns to step 902 and the CPU 102 issues the GetStatus command again. In other words, at least until link establishment between the HDD 119 and the encode processing device 118 is completed, polling processing is performed at predetermined time intervals and the issuance of the GetStatus command is repeated as a result. On the other hand, in the case where the HDD 119 is in the state where a link with the encode processing device 118 is established (in the case where the HDD connection OK flag=0), the processing proceeds to step 904.

At step 904, the CPU 102 determines whether or not the state of the HDD 119 is normal by referring to the information about the state of the HDD 119 included in the various kinds of status information acquired at step 902. In the case where the state of the HDD 119 is normal, the state where the HDD 119 can be accessed normally is checked, and therefore, the present processing is terminated. On the other hand, in the case where the state of the HDD 119 is not normal, the processing proceeds to step 905.

At step 905, the CPU 102 performs appropriate error processing. The contents of the error processing do not relate to the present invention, and therefore, explanation is omitted.

The above is the contents of the processing to acquire the state of the encode processing device 118 and the HDD 119 on the side of the main controller 101. As described above, the CPU 102 of the printing apparatus 100 determines whether it is made possible to actually access the HDD 119 by monitoring the state of the HDD 119 while performing the processing necessary for return by the first and second proxy responses of the encode processing device 118.

The determination results at step 904 are also utilized in processing other than the error processing at step 905. Specifically, the determination results are utilized for the determination whether no problem will occur in the case where each application program on the side of the main controller 101 starts to access the HDD 119 in earnest after the processing of the first proxy response and the second proxy response necessary for the return processing. Then, in the case where starting to access the HDD 119 in earnest will not bring about any problem, processing to set a flag (HDD activation OK flag) indicating that the HDD 119 can be accessed to "ON" or the like is performed where necessary.

In the present embodiment, the return processing from the power save mode to the normal mode is explained mainly, but it is also possible to apply the present embodiment at the time of the normal activation by power source switch on of the printing apparatus 100. In this case, the difference lies only in that the processing is started from the boot processing from the primary storage storing the activation program (see step 302 in FIG. 3) and the subsequent processing is basically the same.

Further, the interface (SATA-IF_H 207 and SATA-IF_D 208) of the encode processing device 118 is not limited to SATA-IF and, for example, another interface, such as PCIe (PCI Express), may be accepted.

Then, the storage device that is connected to the encode processing device 118 as the storage control unit is also not limited to the hard disk device and another storage device, such as an SSD (Solid State Drive), may be accepted.

Further, it may also be possible to provide a plurality of SATA-Device control units 205 and a plurality of SATA-Host control units 206, respectively. For example, in the case where a plurality of hard disk devices is provided for mirroring, a plurality of SATA-Host control units 206 associated with each hard disk device is provided as a result. In this case, a plurality of SATA-IF_Ds 208 for inputting/outputting data between the SATA-Host control unit 206 and the hard disk device is also provided. This also applies to the case where a plurality of SATA-Device control units 205 and a plurality of second SATA-IFs 113 are provided.

According to the present invention, at the time of return from the power save mode to the normal mode, or at the time of the normal activation by power source switch on, it is possible to enter the link establishment state with the host in a pseudo manner by the proxy response by the storage control unit. Consequently, it is made possible to quickly return or activate without the need to wait for the activation of the storage device, and therefore, it is possible to improve user's convenience.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to quickly return or activate without the need to wait for the activation of the storage device, which will take a comparatively long time until return, and therefore, it is possible to improve user's convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165084 filed Aug. 14, 2014, which is hereby incorporated by reference wherein in its entirety.

What is claimed is:

1. An information processing apparatus comprising:
a storage device;
a controller; and
a storage controller which communicates with the storage device and the controller, wherein
the controller transmits a first communication start request to the storage controller,
the storage controller receives the first communication start request from the controller and transmits a second communication start request to the storage device,
the storage device receives the second communication start request from the storage controller, starts activation processing of the storage device based on the second communication start request, and transmits a first completion notice to the storage controller based on completion of the activation processing, the storage controller receives the first completion notice from the storage device and transmits a second completion notice to the controller based on the first completion notice from the storage device, and the controller receives the second completion notice from the storage controller and then transmits a first information acquisition request to the storage controller, and wherein, the storage controller transmits a third completion notice to the controller without waiting for the first completion notice from the storage device, based on the first communication start request from the controller, the controller receives the third completion notice from the storage controller and then transmits a second information acquisition request to the storage controller before receipt of the second completion notice, and the storage controller receives the second information acquisition request from the controller and transmits information, receipt in advance from the storage device, corresponding to the second information acquisition request as a response to the second information acquisition request to the controller without waiting for the first completion notice from the storage device.

2. The information processing apparatus according to claim 1, wherein the storage controller receives the information from the storage device and stores the information in a memory of the storage controller before transmitting the second communication start request to the storage device, and the storage controller transmits the information stored in the memory as the response to the second information acquisition request without waiting for the first completion notice from the storage device.

3. The information processing apparatus according to claim 2, wherein the memory is a non-volatile memory.

4. The information processing apparatus according to claim 1, wherein the second information acquisition request is a command for acquiring device status information of the storage device.

5. The information processing apparatus according to claim 4, wherein the device information indicates communication status between the storage device and the storage controller.

6. The information processing apparatus according to claim 1, wherein the storage controller communicates with the storage device in accordance with the SATA standard and communicates with the controller in accordance with the SATA standard.

7. The information processing apparatus according to claim 1, wherein the storage device is a hard disk device.

8. The information processing apparatus according to claim 7, wherein the activation processing includes disk rotation processing for the hard disk device.

9. The information processing apparatus according to claim 1, wherein the controller transmits the first communication start request at a time of activation of the information processing apparatus or at a time of return from a power save mode of the information processing apparatus.

10. The information processing apparatus according to claim 9, wherein power supply to the controller and the storage controller is stopped when the information processing apparatus is in the power save mode.

11. The information processing apparatus according to claim 1, further comprising a printer which prints an image on a sheet.

12. The information processing apparatus according to claim 1, wherein the information received in advance from the storage device is a serial number of the storage device.

13. The information processing apparatus according to claim 1, wherein the information received in advance from the storage device is an MBR of the storage device.

14. The information processing apparatus according to claim 1, wherein the first communication start request, the second communication start request and the second information acquisition request are commands in accordance with the SATA standard.

15. The information processing apparatus according to claim 1, wherein the second information acquisition request is an extended command of SATA standard.

16. The information processing apparatus according to claim 1, wherein the storage controller includes a data encode processing function.

17. The information processing apparatus according to claim 1, wherein the storage controller determines whether or not a state of the storage device is normal based on a content of the first completion notice from the storage device.

18. The information processing apparatus according to claim 1, wherein the storage controller generates the response to the second information acquisition request without accessing the storage device and transmits the generated response to the controller.

19. A control method of an information processing apparatus having a storage device, the information processing apparatus including a controller and a storage controller, the control method comprising:

transmitting a first communication start request from the controller to the storage controller;

receiving the first communication start request at the storage controller and transmitting a second communication start request from the storage controller to the storage device;

receiving the second communication start request at the storage controller and starting activation processing of the storage device based on the second communication start request;

transmitting a first completion notice from the storage device to the storage controller based on completion of the activation processing;

receiving the first completion notice at the storage controller and transmitting a second completion notice from the storage controller to the controller based on the first completion notice from the storage device;

receiving the second completion notice from the storage controller at the controller and then transmitting a first information acquisition request from the controller to the storage controller;

transmitting a third completion notice from the storage controller to the controller without waiting for the first completion notice from the storage device, based on the first communication start request from the controller;

receiving the third completion notice from the storage controller at the controller and then transmitting a second information acquisition request from the controller to the storage controller before receipt of the second completion notice; and receiving the second information acquisition request from the controller at the storage controller and transmitting information, received in advance from the storage device, corresponding to the second information acquisition request as a response to the second information acquisition request from the storage controller to the controller without waiting for the first completion notice from the storage device.

* * * * *